(12) United States Patent
Friedman (10) Patent No.: US 8,358,238 B1
(45) Date of Patent: Jan. 22, 2013

(54) MANEUVERING MISSILE ENGAGEMENT

(75) Inventor: Daniel L. Friedman, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 535 days.

(21) Appl. No.: 12/612,056

(22) Filed: Nov. 4, 2009

(51) Int. Cl.
*F41G 7/30* (2006.01)
*F41G 7/20* (2006.01)
*F41G 7/00* (2006.01)

(52) U.S. Cl. ............ 342/62; 342/61; 342/175; 342/195; 244/3.1; 244/3.11; 244/3.14; 89/1.11

(58) Field of Classification Search ............ 244/3.1–3.3; 89/1.11; 342/61, 62, 89–93, 175, 195, 13, 342/67, 68, 73–81, 104–115, 118, 145–147, 342/176, 179, 180
See application file for complete search history.

(56) References Cited

U.S. PATENT DOCUMENTS

| | | | |
|---|---|---|---|
| 3,378,835 A | 4/1968 | Mooney, Jr. et al. | |
| 3,378,840 A | 4/1968 | Mooney, Jr. | |
| 3,412,396 A | 11/1968 | Mooney, Jr. | |
| 3,448,452 A | 6/1969 | Mooney, Jr. | |
| 3,724,783 A | 4/1973 | Nolan, Jr. et al. | |
| 3,982,713 A | 9/1976 | Martin | |
| 4,308,538 A | 12/1981 | Albersheim | |
| 4,817,495 A | 4/1989 | Drobot | |
| 5,311,189 A | 5/1994 | Nagel | |
| 5,340,056 A | 8/1994 | Guelman et al. | |
| 5,381,156 A | 1/1995 | Bock et al. | |
| 5,501,413 A | 3/1996 | Kilger et al. | |
| 5,611,502 A | 3/1997 | Edlin et al. | |
| 5,710,423 A | 1/1998 | Biven et al. | |
| 5,788,179 A | 8/1998 | Wicke | |
| 5,811,788 A | 9/1998 | Wicke | |
| 6,043,867 A * | 3/2000 | Saban | 244/3.17 |
| 6,209,820 B1 | 4/2001 | Golan et al. | |
| 6,666,401 B1 | 12/2003 | Mardirossian | |
| 6,877,691 B2 | 4/2005 | DeFlumere et al. | |
| 7,026,980 B1 | 4/2006 | Mavroudakis et al. | |
| 7,032,858 B2 | 4/2006 | Williams | |
| 7,137,588 B2 | 11/2006 | Humphrey | |
| 7,236,121 B2 | 6/2007 | Caber | |
| 7,394,047 B1 | 7/2008 | Pedersen | |
| 7,411,543 B1 * | 8/2008 | Boka | 342/90 |
| 7,473,876 B1 | 1/2009 | Pedersen et al. | |
| 7,511,252 B1 | 3/2009 | Pedersen et al. | |
| 7,548,194 B2 | 6/2009 | Wood | |
| 7,552,669 B1 | 6/2009 | Denis et al. | |
| 7,663,528 B1 * | 2/2010 | Malakian et al. | 342/13 |
| 7,724,183 B2 * | 5/2010 | Mountcastle | 342/180 |
| 7,875,837 B1 | 1/2011 | Szabo et al. | |
| 7,994,967 B2 * | 8/2011 | Mountcastle | 342/180 |
| 8,115,148 B1 * | 2/2012 | Boardman et al. | 244/3.14 |

OTHER PUBLICATIONS

Mosher, D.E.; The grand plans [ballistic missile defense]; IEEE Spectrum, Sep. 1997 ; 34:9 ; p. 28-39.

Garwin, R.L.; "Boost-Phase Intercept—Not If, But When"; Jul. 2000; Inside Missile Defense; www.fas.org/rlg/rlg071NMD_TEXT.htm.

Kreysig, E., "Advanced Engineering Mathematics", Eight Edition, John Wiley & Sons, Inc., 1999, p. 942-952.

"Boost-Phase Intercept"; www.fas.org/spp/starwars/program/bpi.htm; at least as early as Nov. 4, 2009.

* cited by examiner

*Primary Examiner* — Bernarr Gregory
(74) *Attorney, Agent, or Firm* — Howard IP Law Group, PC (57) ABSTRACT

A hostile missile is identified as being of a type which maneuvers aerodynamically within the atmosphere when it performs an exoatmospheric maneuver which significantly changes its specific energy. When the determination is made that the hostile missile is an atmospheric maneuvering missile, the hostile missile is engaged with an interceptor which is guided toward a predicted intercept point (PIP) assuming horizontal hostile missile flight at an altitude above a specified minimum altitude.

20 Claims, 7 Drawing Sheets

MANEUVERING MISSILE ENGAGEMENT

GOVERNMENTAL INTEREST

This invention was made with Government support under contract No. N00024-03-C-6110 awarded by the Department of the Navy. The Government has certain rights in this invention.

BACKGROUND OF THE INVENTION

Missile threats are propagating throughout the world, with unstable nations believed to be in possession of both ballistic missiles and nuclear warheads. Attention has been directed toward countermeasures for hostile missiles. There are many aspects to the problems of engaging hostile missiles. For example, there are limitations on the knowledge of where and when a missile launch may take place, so the sensors or intelligence necessary for accurate identification and tracking may not be available or in place. If the path of the hostile missile is not known, it cannot, in general, be engaged, and may achieve its hostile intent. If sensors such as radar or infrared systems are available, they may produce useful target tracking information, but such sensors are subject to the deleterious effects of noise and various types of uncertainty, such as uncertainty as to the actual location of the sensor and its direction. These uncertainties are compounded when multiple sensors view the region in which the hostile target is found, as the differences among the sensors may result in the appearance of more hostile missiles than actually exist, or possibly fewer.

It may not be possible to locate the sensors the launch point of the hostile missile. Consequently, the missile may not be detected until it is well into its flight, as when it is in the exosphere, at which time its booster engines may be exhausted. In such a scenario, the hostile missile may have to be engaged in its terminal or ballistic phase. Engagement may be accomplished by use of an interceptor missile. Various missile tracking and interceptor missile control schemes have been proposed or used.

If countermeasures are available near the launch site of a hostile missile, engagement in the boost phase might be possible. Boost phase engagement is desirable, so as to avoid problems associated with hostile missile countermeasures. Such countermeasures may include deployment of decoy objects to tend hide the location of the reentry vehicle and to confuse the interceptor missile control system. A description of a method for targeting a reentry vehicle within a group of decoys appears in U.S. patent application Ser. No. 12/473,032 filed May 27, 2009, (now U.S. Pat. No. 8,115,148) in the name of Boardman et al. Boost phase engagement is rendered difficult by limitations on the ability of sensors to acquire the hostile missile target at or near the time of launch due to obscuring terrain features. Additionally, the boosting missile changes its mass as propellant is consumed, and the time at which the boost engine cuts off is not known in advance, so its velocity from moment to moment may be difficult to determine. Even if the track of the hostile missile is well established, additional problems with engagement involve initiation of the control system of an interceptor missile, and details of the interceptor missile controls. Boost-phase engagement of hostile missiles is described in copending U.S. patent application Ser. No. 11/958,421 filed Dec. 18, 2007, in the name of Pedersen, and in many other references.

Guidance of interceptor missiles is rendered difficult because of the transition of the hostile or target missile from boost mode to ballistic mode at some point in its trajectory. Some of the problems associated with targeting of a hostile missile are described in U.S. patent application Ser. No. 12/395,830 filed Mar. 2, 2009, (now U.S. Pat. No. 8,106,340) in the name of Diaz et al.

In the continuing race between the designers of attack missiles and the designers of countermeasures, hostile missiles are improved by becoming more sophisticated. Among such improvements is the introduction of missile maneuvers during exo-atmospheric and endo-atmospheric flight. Such maneuvers may defeat ballistic missile engagement systems which are predicated on ballistic motion of the target.

Improved missile engagement is desired.

SUMMARY OF THE INVENTION

A method according to an aspect of the invention is for engaging a ballistic missile target. The method comprises the steps of sensing a ballistic target, and measuring its exoatmospheric position, and determining its exoatmospheric velocity. The method further comprises the determination, from time to time, of the specific energy of the target. The specific energy determined at a given time, such as the time of the current update, is compared with that determined at an earlier time, namely the time of a previous update, to generate a specific energy difference. The specific energy differences are compared with a threshold. In response to each difference in the specific energy being below the threshold the steps are repeated of determining the specific energy of the target, processing the specific energy of a current determination with that of a previous determination to generate a specific energy difference, and comparing the difference with a threshold. In response to the difference being greater than the threshold, the target is deemed to be maneuvering exoatmospherically and to be of a type which transitions from exoatmospheric ballistic motion to aerodynamic flight within the atmosphere. When the target is so identified, the interceptor missile is guided toward an expected intercept point within the atmosphere. The expected intercept point, in one mode of the method, is found by (a) determining a ballistic intercept point assuming that the target follows a ballistic trajectory and (b) modifying the ballistic intercept point toward which the interceptor missile is guided to account for the aerodynamic flight characteristics. In a most preferred mode of the method, the step of modifying the ballistic intercept point toward which the interceptor missile is guided includes the step of maintaining the minimum value of the predicted altitude of intercept above a given value, or in the alternative the step of preventing the minimum value of the predicted altitude of intercept from dropping below a minimum.

A method according to an aspect of the invention is for engaging a ballistic missile target. The method comprises the steps of sensing a ballistic target, measuring its position, and determining its velocity, and, from time to time, determining the exoatmospheric specific energy of the target. The method further comprises the step of processing the specific energy of a current determination of the specific energy with that of a previous determination, which may be the immediately preceding determination, to generate a specific energy difference. The specific energy difference(s) is or are compared with a threshold energy. In response to the difference in specific energy being below the threshold energy, the steps are repeated of determining the specific energy of the target, processing the specific energy of a current determination with that of a previous determination to generate a specific energy difference, and comparing the difference with a threshold. In response to the difference being greater than the threshold, the target is deemed to be maneuvering and to be of a type which transitions from exoatmospheric ballistic motion to aerodynamic flight within the atmosphere. An expected intercept point within the atmosphere is determined, and an interceptor missile is guided toward the expected intercept point. In one mode of this method, the step of determining an expected intercept point includes the steps of determining a ballistic intercept point assuming that the target follows a ballistic trajectory, and modifying the ballistic intercept point to account for the aerodynamic flight. The step of modifying the ballistic intercept point toward which the interceptor is guided may comprise the step of maintaining the predicted altitude of intercept above a threshold value of altitude.

In a preferred mode of the method, the step of determining an expected intercept point within the atmosphere may comprise the step of taking the difference between the current altitude of the target and the threshold value, and determining the time-to-go for the target to reach the threshold value. In this mode, a determination is made of a speed ratio related to the absolute velocity of the target and the horizontal velocity of the target. The horizontal pseudocomponents of velocity of the target in horizontal flight is or are determined by multiplying the horizontal components of the target velocity by the speed ratio. A determination is made of pseudo-horizontal-position of the target. This determination is made by adding the current horizontal position of the target to the quotient of (a) the difference between the pseudocomponents and the target velocity components (b) divided by the time-to-go.

A method according to another aspect of the invention is for engaging a target missile. This method comprises the steps of tracking the target missile with a sensor, and computing sensor-to-target range, target velocity, and interceptor-to-target range. The interceptor average velocity is computed, and the target missile relative heading to intercept is computed assuming ballistic motion of the target missile. The interceptor relative heading to intercept is computed assuming ballistic motion of the target missile. Interceptor time-to-go to intercept is computed assuming ballistic motion of the target missile, and a predicted intercept point is computed assuming ballistic motion of the target missile. A determination is made if (a) the predicted intercept point assuming ballistic motion is less than a threshold altitude and (b) the target missile is capable of aerodynamic flight. If (a) the predicted intercept point is less than a threshold altitude and (b) the target missile is capable of aerodynamic flight, the kinetic parameters of the target missile are adjusted to reflect horizontal motion at the threshold altitude. Target missile relative heading to intercept is computed assuming adjusted motion of the target missile. Interceptor relative heading to intercept is computed assuming adjusted motion of the target missile. Interceptor time-to-go to intercept is computed assuming adjusted motion of the target missile. A predicted intercept point is computed assuming adjusted motion of the target missile. Interceptor range-to-go to intercept point is computed. Interceptor heading error to the intercept point is computed, and the heading error is applied to guide the interceptor.

In a particular mode of this method, the step of determining if (b) the target missile is capable of aerodynamic flight comprises the steps of, from time to time, determining the exoatmospheric specific energy of the target missile. The exoatmospheric specific energy of the missile during successive determinations is computed, to establish the magnitude of exoatmospheric specific energy changes. The magnitude(s) of the specific energy changes are compared with a threshold energy level, and if the specific energy changes exceed the threshold, the target missile is deemed to be capable of aerodynamic flight. The successive determinations may be immediately successive determinations.

DESCRIPTION OF THE INVENTION

Specific energy of a missile in flight is the sum total of the potential energy and the kinetic energy. Once the boost phase of flight is completed, the remaining flight is ordinarily ballistic, and the specific energy represents the total energy imparted to the missile. Once the boost phase is completed, specific energy can be used to determine the maximum ground range to the impact point.

A significant change in specific energy of a missile during what was previously ballistic flight indicates that additional energy is being added to the missile system and is indicative of a maneuver. The addition of energy may increase or decrease the specific energy. It should be noted that the specific energy of a ballistic missile has some variability, and the minimum usually occurs at apogee (that portion of an orbit at which the separation of masses is maximum). According to an aspect of the invention, exoatmospheric specific energy changes greater than a particular threshold are deemed to be indicative of aerodynamic maneuvering capability. The identification of a aerodynamic maneuvering capability, in turn, can be used to trigger appropriate engagement system responses to preserve interceptor missile intercept capability.

Figure 1:
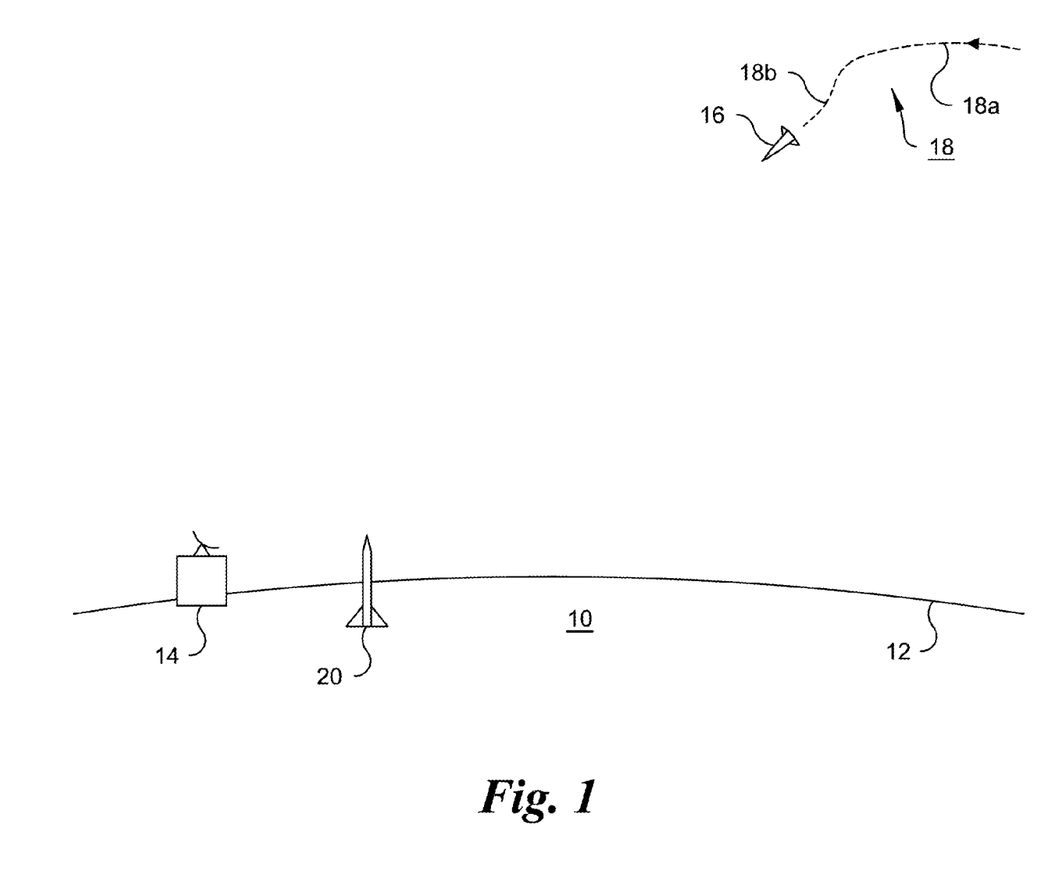
FIG. 1 is a simplified representation of a scenario in which a hostile missile or target is detected by a radar system and an interceptor missile is arranged to be initialized for intercept depending upon processing of specific energy information.

FIG. 1 is a simplified diagram illustrating a scenario 10 in which the horizon is designated 12. Scenario 10 may represent a land or sea region, or a mixed land/sea region. In scenario 10, a radar system 14 detects and tracks an "incoming" hostile missile or reentry vehicle 16 following an exoatmospheric ballistic track portion 18a and a non-ballistic or powered exoatmospheric track portion 18b. An interceptor missile 20 is poised for initialization with pre-launch information from radar 14 in readiness for launch to counter the hostile missile 16. The powered or non-ballistic portion 18b of the track of hostile missile 16 gives rise to a change in the specific energy.

Figure 2A:
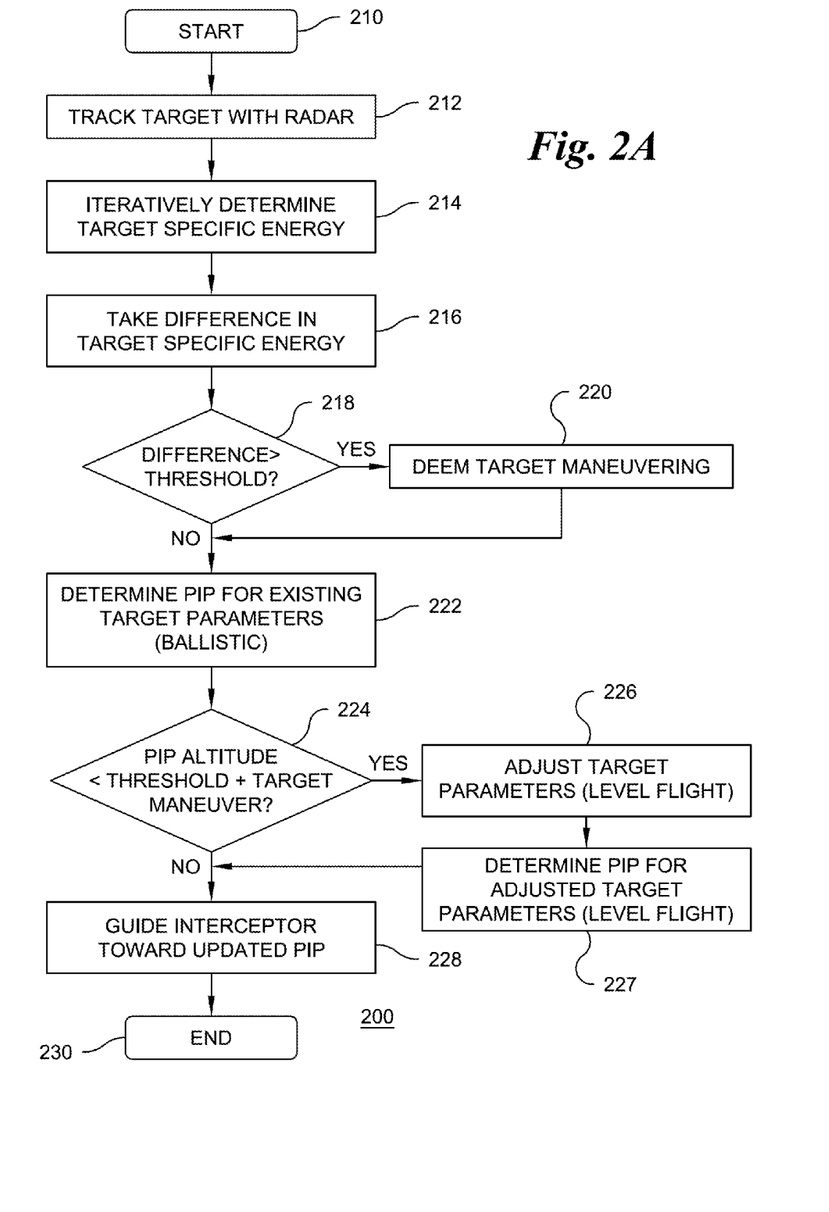
FIG. 2A is a simplified logic flow chart or diagram illustrating the overall operation of the radar and interceptor according to an aspect of the invention.
Figure 2B:
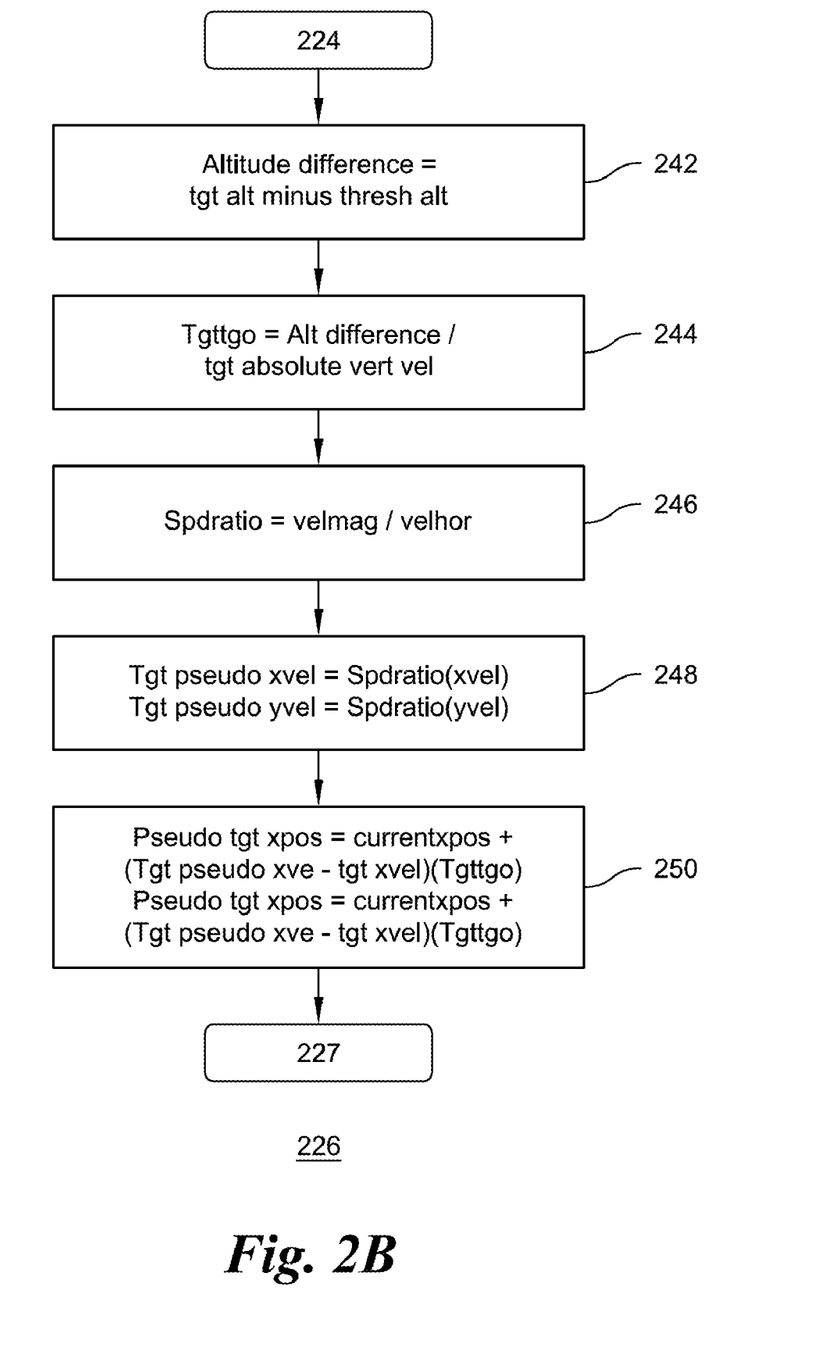
FIG. 2B is a simplified logic flow diagram of a portion of the logic of FIG. 2A.

FIGS. 2A and 2B together constitute a simplified logic flow chart or diagram illustrating aspects of the invention. In FIG. 2A, the logic begins at a START block 210, and flows to a block 212, representing the tracking (generating a target location history) of a hostile target (missile) 16 with a radar system such as 14 of FIG. 1, to determine target parameters such as location, velocity, and acceleration. From block 212, logic 200 flows to a block 214, which represents the iterative determination of the specific energy from the target track data. Block 216 represents the taking of the difference between the current value of the specific energy and the specific energy at a previous iteration, such as the immediately previous iteration. The difference in specific energy is compared with a threshold in a decision block 218. If the difference in specific energy is below a particular level, the logic leaves decision block 218 by the NO output, and flows to a block 222. In this case, the target (16 of FIG. 1) is deemed to be an ordinary ballistic missile, and the initialization of the interceptor missile or antimissile 20 is for the "ballistic" target mode. If the difference in the specific energy is greater than the threshold value, the logic 200 flows to a block 220, which represents the deeming of the target to be maneuvering.

Figure 3:
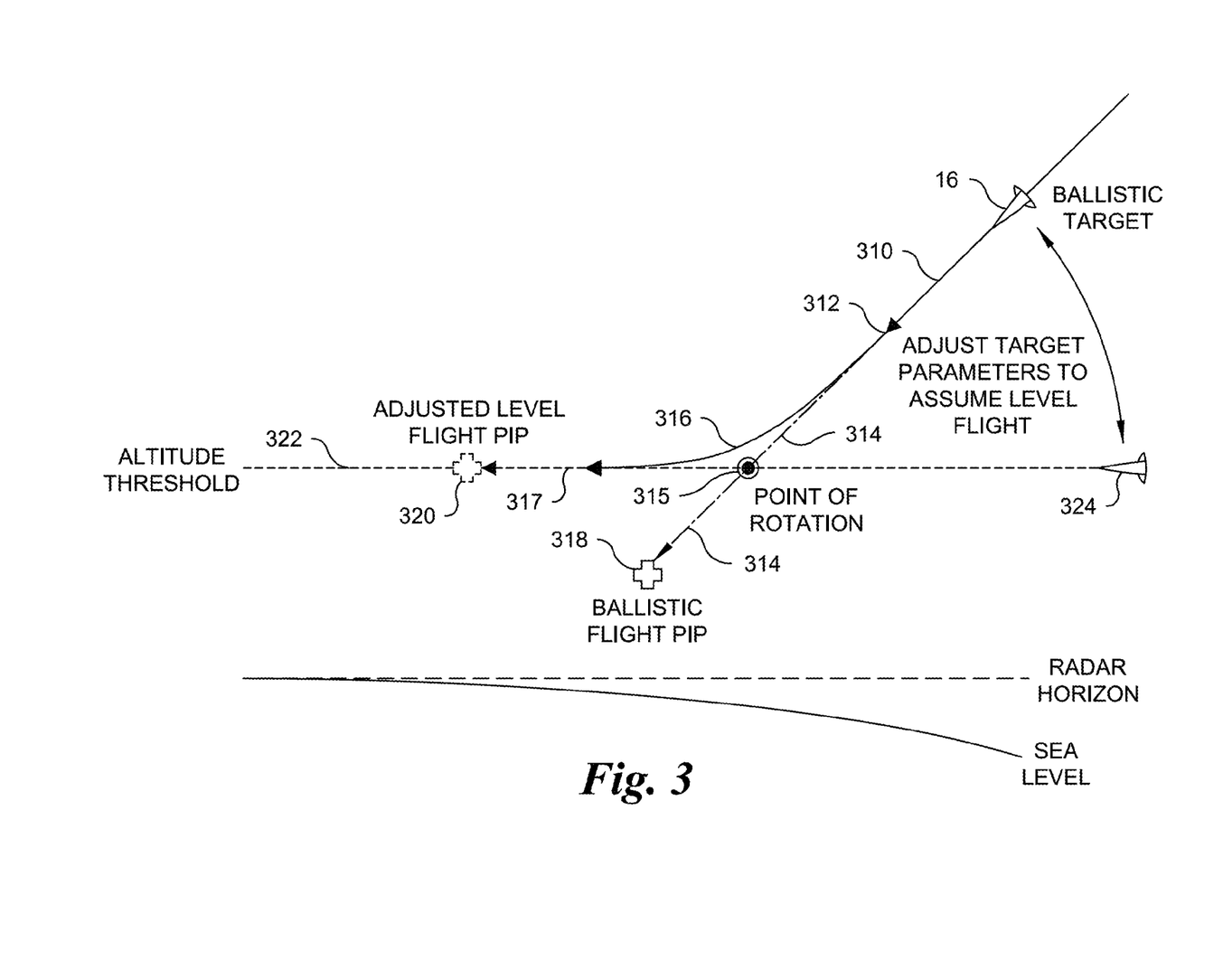
FIG. 3 is a diagram of altitude versus range geometry for an assumed intercept of a maneuvering reentry vehicle.

The target maneuver in the exoatmosphere (the transition between target track 18a and 18b of FIG. 1) is what the specific energy threshold of block 220 of FIG. 2A detects in order to deem the target to be aerodynamically maneuverable. When the target is deemed to be aerodynamically maneuverable, it is deemed to be capable of aerodynamic, rather than purely ballistic, motion. Such aerodynamic motion is represented in FIG. 3 by the transition of exoatmospheric ballistic target track 310 to curved track 316 within the atmosphere rather than straight track 314. When the hostile or target missile 16 is deemed to be aerodynamically maneuverable, it is presumed to be capable of another maneuver in the atmosphere, namely a maneuver to or for level flight. That is, once the target has been found to maneuver exoatmospherically, the target is deemed to be capable of "flying" in a manner similar to that of an airplane, or more specifically as a glider, as suggested by path 317 of FIG. 3.

From either block 220 of FIG. 2A (the result of a determination of aerodynamic maneuverability) or from the NO output of block 218 of FIG. 2A (no aerodynamic maneuverability), the logic 200 of FIG. 2 arrives at a block 222. Block 222 represents computation or calculation of an intercept solution or predicted ballistic intercept point (PIP) for the target missile, given the existing target parameters and assuming that the missile is in ballistic motion. This computation may be performed in any manner consistent with the prior art. It will be noted that in this part of the logic 200 of FIG. 2A, the determination may have already been made in block 220 that the target 16 is maneuvering, but block 222 assumes that it is ballistic in order to determine the ballistic flight PIP 318 of FIG. 3.

From block 222 of FIG. 2A, the logic 200 flows to a decision block 224, which decides if both (a) the target is deemed to be exoatmospherically maneuvering and (b) the altitude of the predicted ballistic intercept point (PIP) is less than or below a predetermined threshold altitude. If both of these conditions are met, the logic leaves decision block 224 by the YES output, and flows to a block 226. Block 226 represents the determination of a new predicted intercept point with the target parameters adjusted for (or to assume) level "flight" of the target missile. Details of the logic of block 226 appear in the flow chart of FIG. 2B. When the target parameters are adjusted for level flight of the target missile, the logic leaves block 226 of FIG. 2A and arrives at a block 227. Block 227 represents determination of the predicted intercept point (PIP) for (with) the target parameters adjusted to assume level flight. From either the NO output of decision block 224 or from block 227, the logic 200 of FIG. 2A flows to a block 228, which represents the guiding of the interceptor missile (20 of FIG. 1) toward the PIP. The location of the PIP will depend, of course, on whether a nonmaneuvering ballistic missile or an aerodynamically maneuvering target missile has been identified. The logic 200 ends at an END block 230.

FIG. 3 illustrates the re-orientation of the target parameters related to the processing in block 226 of FIG. 2A. In FIG. 3, the horizon is represented by the curved solid "Sea Level" line. The Radar Horizon is also illustrated as a dash line. The hostile missile or reentry vehicle 16 initially follows a ballistic path illustrated as portion 310 of the target velocity path. Depending upon the capabilities of the missile 16, either a ballistic continuation path 314 will be followed or an aerodynamically maneuvering path 316, 317 will be followed. The continuation of the ballistic path 310 is designated 314.

If the hostile missile 16 of FIG. 3 is deemed to be ballistic, its path will continue along path 314, and prior-art arrangements or methods for targeting the missile 16 can be used to effect an intercept at a PIP location such as 318 of FIG. 3. Thus, the interceptor missile control, whether on- or off-board the interceptor, determines (block 222 of FIG. 2A) a predicted intercept point (PIP) based on the ballistic path 310, 314. The PIP so determined is represented by a cross or X mark 318.

In the case that the hostile missile 16 of FIG. 3 is deemed to be capable of aerodynamic maneuvering, the atmospheric maneuver takes place at a point designated 312 in FIG. 3. This atmospheric maneuver is the one anticipated by the change in specific energy illustrated as 18b in FIG. 1 and detected in decision block 218. This atmospheric maneuver, in turn, means that the target will not follow the ballistic path 314 of FIG. 3, but will instead follow a path such as curved path 316 as it enters thicker parts of the atmosphere and glides. Point 315 of FIG. 3 represents a nominal point of rotation of the missile path in the transition from ballistic to aerodynamic motion.

Guidance of the interceptor missile toward the PIP 318 of FIG. 3 will be unavailing in engaging a maneuvering target which is not following the ballistic path represented by dot-dot-dash path 314. According to an aspect of the invention, the interceptor guidance is re-set by block 226 of FIG. 2A to assume horizontal flight of the target missile, and to set the aerodynamic-maneuvering intercept point 320 of FIG. 3 to the threshold altitude. The threshold altitude is represented in FIG. 3 by 322. The switch to horizontal flight of the target 16 is conceptually handled by assuming that the target is in horizontal flight at the threshold altitude 322.

FIG. 2B is a simplified flow chart or diagram illustrating some details of the calculation of the adjusted (horizontal-flight) parameters of the PIP, or in other words details of the logic of block 226 of FIG. 2A. In FIG. 2B, the logic arrives at block 242 from block 224 of FIG. 2A. The time of flight from the target's current altitude to the threshold altitude 322 of FIG. 3 is determined by taking the difference between the current and threshold altitudes of the target (tgt), as suggested by block 242. Block 244 of FIG. 2B determines the target time-to-go to arrive at the threshold altitude 322. The altitude difference is divided by the absolute value of the target's vertical velocity, as suggested by block 244 of FIG. 2B. The velocity ratio Spdratio of the magnitude of target velocity to target horizontal velocity is computed, block 246. The ratio is used to adjust the target x & y components of horizontal velocity for the assumed horizontal flight at the threshold altitude, as suggested by block 248. Block 250 represents determination of the adjusted target x and y positions. This is accomplished by adding to the current target x & y position the product of the difference of the current and adjusted x and y velocities and the time-to-go to the altitude threshold. These adjusted target positions and velocities (altitude set to threshold altitude and vertical rate set to zero) are used to determine a new intercept point 320 which presumes horizontal flight. The new PIP 320 is calculated based on the horizontal flight assumption, as suggested by block 250 of FIG. 2B, and is represented in FIG. 3 by PIP 320. The logic of block 250 of FIG. 2B returns to block 228 of FIG. 2A. The interceptor missile is guided toward the new PIP 320. Such guidance is well known in the art, and needs no additional explanation.

Figure 4A:
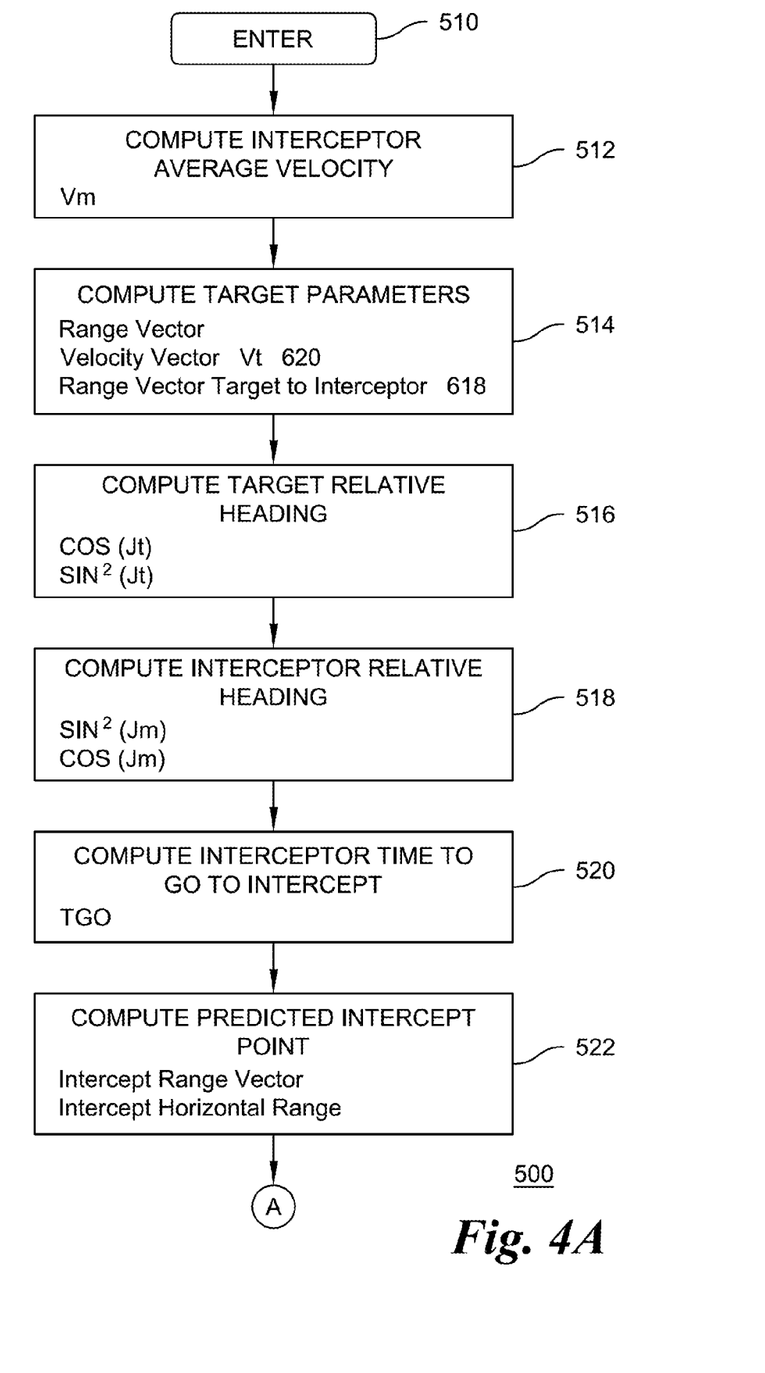
FIGS. 4A and 4B together represent a more detailed logic flow chart or diagram illustrating the operation according to an aspect of the invention.
Figure 4B:
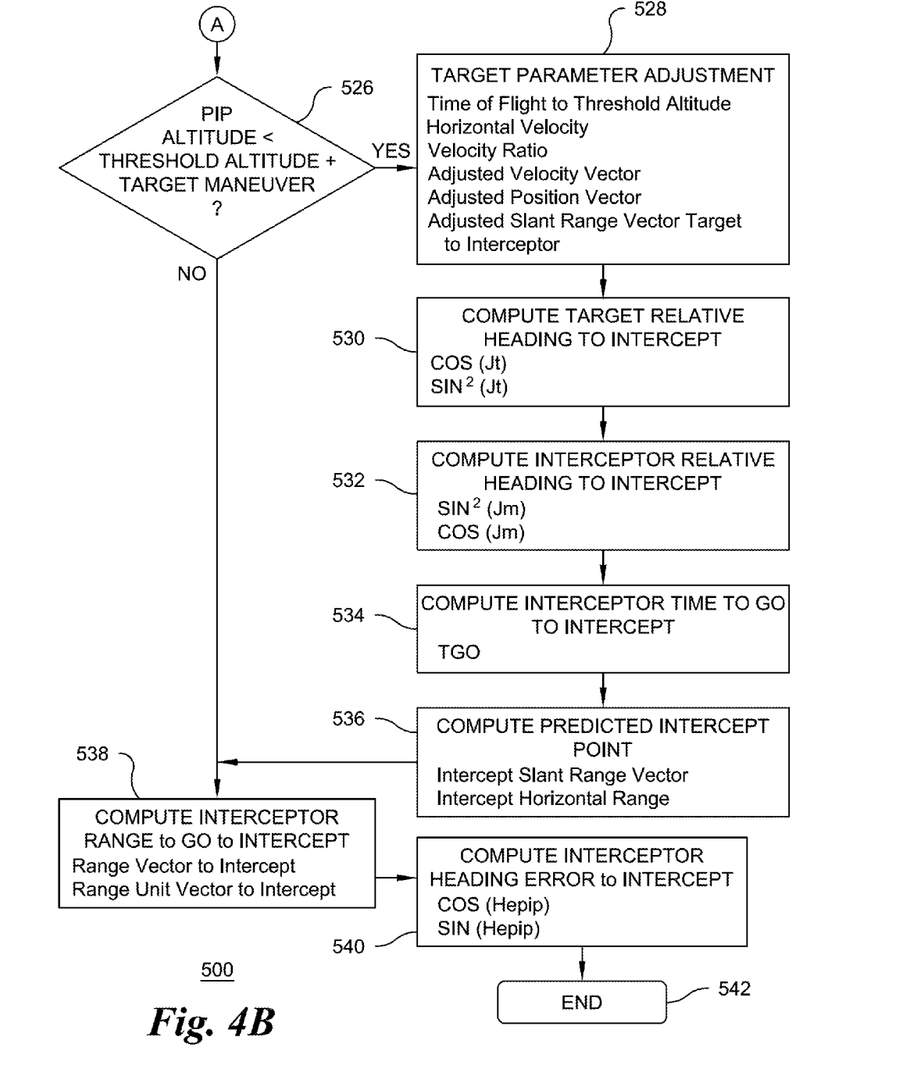
Figure 5:
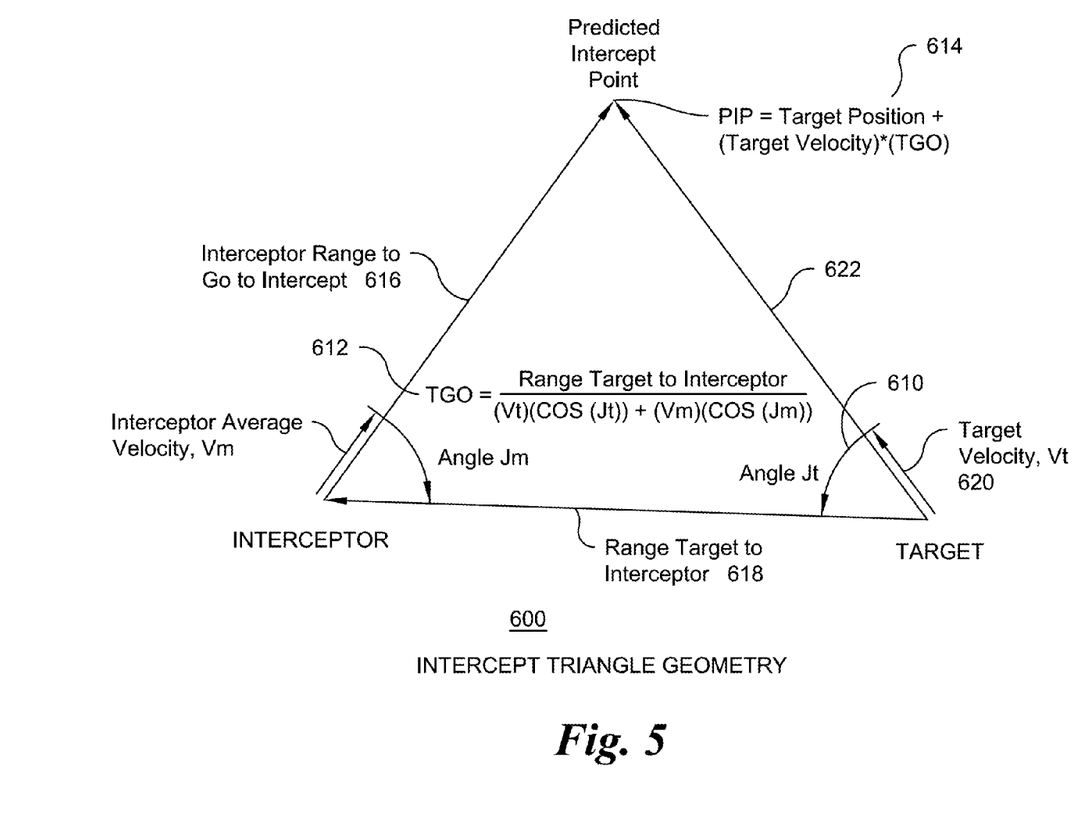
FIG. 5 is an intercept triangle.

FIGS. 4A and 4B together illustrate the logic 500 for determining the predicted aerodynamic intercept point 320 for interceptor guidance. The logic 500 of FIG. 4 can be understood with the aid of the intercept triangle 600 of FIG. 5. Logic 500° F. FIG. 4 begins at an Enter block 510, and flows to a block 512, which represents computation of the interceptor average velocity vector Vm. The interceptor average velocity vector Vm lies along the Interceptor Range to Go to Intercept leg 616 of the intercept triangle 600 of FIG. 5. The target-to-interceptor range 618 is the difference between the target range from the tracking source or radar 14 (not illustrated in FIG. 5) and the interceptor range from the tracking source. The target range vector and the target velocity vector Vt 620 are determined from radar track data in Compute Target Parameters block 514 of FIG. 4. The target-to-interceptor range vector 618 of FIG. 5 is determined, also in block 514 of FIG. 4A, by differencing the components of range from the target and interceptor range vectors. The logic 500 flows from block 514 to a block 516. Block 516 computes the target relative heading, by determining the cosine of the target relative heading angle Jt 610 (FIG. 5). The cosine of the target relative heading Jt 610 is determined by taking the dot product of the target velocity vector Vt 620 with the target-to-interceptor range vector 618 in block 516 of FIG. 4A. The sine squared of the relative heading angle is also determined in block 516 using the geometrical relationship 1–cosine squared of the relative heading angle Jt. The sine squared of the interceptor heading angle Jm is determined in block 518 using the geometric law of sines with the target and interceptor velocities and the sine squared target relative heading angle Jt obtained in 516. The cosine of the interceptor relative heading angle Jm is determined in block 518 by using the geometrical relationship square root of 1–sine squared of the relative heading angle. The relative velocity between the target and interceptor is determined as the sum of the projection of the target and interceptor velocities onto the range vector target to interceptor using the cosine of their respective relative heading angles (Jt and Jm in FIG. 5). The time to go TGO to intercept the target is obtained in block 520 by dividing the target-to-interceptor range by the relative velocity (612 in FIG. 5). The time to go to intercept (TGO) obtained in block 520 is processed in block 522 by multiplication by the target's velocity vector, and adding to the target position vector, to thereby determine the range vector of the predicted intercept point. The range vector of the predicted intercept point is illustrated by 614 in FIG. 5. From block 522 of FIG. 4A, the logic 500 flows by way of a node A to a decision block 526 of FIG. 4B.

The logic 500 flows by way of node A to a decision block 526 of FIG. 4B. The predicted intercept point (PIP) determined in block 522 of FIG. 4A is based on the target's ballistic flight path. Decision block 526 of FIG. 4B determines if (a) the altitude of the predicted intercept point computed in block 522 is below the threshold altitude and (b) the target was deemed to be maneuvering by virtue of specific energy changes in block 220 of FIG. 2A. If so, the logic leaves decision block 526 by the YES path and arrives at a block 528, in which the target parameters are adjusted to represent horizontal atmospheric flight. The adjustment of target parameters in block 528 first determines the target's time of flight to the threshold altitude by taking the difference of the target's current altitude and the threshold altitude, and dividing by the absolute value of the target's vertical velocity. A scale factor of target velocity is calculated as the ratio of magnitude of total velocity and horizontal velocity. For a descending target this results in a value greater than 1. The horizontal components of target velocity are multiplied by the scale factor to create an adjusted velocity with the vertical component set to zero, to thereby represent level flight. The target horizontal position components are adjusted by adding the product of the difference in current velocity components and adjusted velocity components and the target time of flight to the threshold altitude. The adjusted target vertical position is set to the threshold altitude value. This adjusted target position is illustrated by 324 in FIG. 3. The processes for determining target relative heading (530), interceptor relative heading (532), interceptor time to go (534) and the predicted intercept point (536) are repeated as previously described, but using the target adjusted parameters as if the target was in level flight in the atmosphere.

The predicted intercept point computed in block 536 in FIG. 4 replaces that of block 522 in support of interceptor guidance when the intercept altitude is below the threshold altitude and the target is deemed to be maneuvering. Otherwise the intercept point determined in 522 (from ballistic target flight path) is used for interceptor guidance.

In block 538 of FIG. 4 the interceptor range vector to go to intercept is computed by differencing the components of the predicted intercept range vector obtained in either block 522 or 536, as appropriate, with the components of the interceptor range vector. The unit interceptor range to go to intercept vector is obtained by dividing the components by the magnitude of the interceptor range to go to intercept vector.

In block 540 of FIG. 4 the interceptor cosine of heading error angle to intercept is obtained by taking the dot product of the unit interceptor range to go to intercept vector with the interceptor unit velocity vector. The sine of the interceptor heading error angle is obtained using the geometrical relationship square root of 1–cosine squared of the heading error angle.

The parameters obtained in blocks 538 and 540 of FIG. 4 support interceptor guidance computations. The logic process of FIGS. 4A and 4B is completed in END block 542. When updated radar target and interceptor track data is or are again provided, the logic starts again at 210 of FIG. 2A. This process is continued until the engagement is terminated, regardless of whether intercept is achieved.

A method according to an aspect of the invention is for engaging a ballistic missile target (16). The method comprises the steps of sensing (212) a ballistic target (16), measuring its exoatmospheric position, and determining its exoatmospheric velocity. The method further comprises the determination, from time to time, of the exoatmospheric specific energy of the target (214). The specific energy determined at a given time (the current update) is compared (216) with that determined at an earlier time (the previous update) to generate a specific energy difference. The specific energy differences are compared (218) with a threshold. In response to each successive difference in the specific energy being below the threshold, the steps (212, 214, 216, 218) are repeated of determining the specific energy of the target, processing the specific energy of a current determination with that of a previous determination to generate a specific energy difference, and comparing the difference with a threshold. In response to the difference being greater than the threshold (218 YES), the target (16) is deemed to be maneuvering (220) and to be of a type which transitions from exoatmospheric ballistic motion to aerodynamic flight within the atmosphere. When the target is so deemed, the interceptor missile is guided toward an expected intercept point (318 or 320) within the atmosphere. The expected intercept point (320), in one mode of the method, is found by (a) determining a ballistic intercept point (318) assuming that the target follows a ballistic trajectory (314) and (b) modifying the ballistic intercept point (318) toward which the interceptor missile (20) is guided (228) to account for the aerodynamic flight characteristics, so that the modified PIP (320) lies at a given altitude. In a most preferred mode of the method, the step of modifying the ballistic intercept point toward which the interceptor missile is guided (228) includes the step (242) of maintaining the minimum value (322) of the predicted altitude of intercept above a given value, or in the alternative the step of preventing the minimum value of the predicted altitude of intercept from dropping below a minimum.

A method according to an aspect of the invention is for engaging a ballistic missile target (16). The method comprises the steps of sensing a ballistic target, measuring its position, and determining its velocity (212), and, from time to time, determining the exoatmospheric specific energy of the target (214). The method further comprises the step of processing the specific energy of a current determination of the specific energy with that of a previous determination, which may be the immediately preceding determination, to generate a specific energy difference (216). The specific energy difference(s) is or are compared (218) with a threshold energy. In response (218 NO) to the difference in specific energy being below the threshold energy, the steps are repeated of determining the specific energy of the target (214), processing the specific energy of a current determination with that of a previous determination to generate a specific energy difference (216), and comparing (218) the difference with a threshold. In response (220 YES) to the difference being greater than the threshold, the target (16) is deemed (220) to be maneuvering and to be of a type which transitions (312) from exoatmospheric ballistic motion (310) to aerodynamic flight (316) within the atmosphere. An expected intercept point (318; 320) within the atmosphere is determined (222; 226, 228), and an interceptor missile (20) is guided (228) toward the expected intercept point (318; 320). In one mode of this method, the step of determining an expected intercept point includes the steps of determining (236) a ballistic intercept point (318) assuming that the target follows a ballistic trajectory (310, 314), and modifying the ballistic intercept point to account for the aerodynamic flight (316). The step of modifying the ballistic intercept point (318) toward which the interceptor (20) is guided may comprise the step of maintaining the predicted altitude of intercept above a threshold value (322) of altitude.

In a preferred mode of the method, the step of determining (222; 226, 228) an expected intercept point (318; 320) within the atmosphere may comprise the step of taking the difference (242) between the current altitude of the target and the threshold value, and determining (244) the time-to-go for the target to reach the threshold value. In this mode, a determination is made of a speed ratio related to the absolute velocity of the target and the horizontal velocity of the target (246). The horizontal pseudocomponents of velocity of the target in horizontal flight is or are determined by multiplying the horizontal components of the target velocity by the speed ratio (248). A determination is made of pseudo-horizontal-position of the target. This determination is made by adding the current horizontal position of the target to the quotient of (a) the difference between the pseudocomponents and the target velocity components (b) divided by the time-to-go (250).

A method (500) according to another aspect of the invention is for engaging a target missile (16). This method (500) comprises the steps of tracking the target missile with a sensor (14), and computing sensor-to-target range, target velocity, and interceptor-to-target range (514). The interceptor average velocity is computed (514), and the target missile relative heading to intercept is computed assuming ballistic motion of the target missile (516). The interceptor relative heading to intercept is computed (518) assuming ballistic motion of the target missile. Interceptor time-to-go to intercept is computed assuming ballistic motion of the target missile (520), and a predicted intercept point is computed assuming ballistic motion of the target missile (522). A determination is made (526) if (a) the predicted intercept point assuming ballistic motion is less than a threshold altitude and (b) the target missile is capable of aerodynamic flight (526). If (a) the predicted intercept point is less than a threshold altitude and (b) the target missile is capable of aerodynamic flight, the kinetic parameters of the target missile are adjusted to reflect horizontal motion at the threshold altitude (528). Target missile relative heading to intercept is computed assuming adjusted motion of the target missile (530). Interceptor relative heading to intercept is computed assuming adjusted motion of the target missile (532). Interceptor time-to-go to intercept is computed assuming adjusted motion of the target missile (534). A predicted intercept point is computed assuming adjusted motion of the target missile (536). Interceptor range-to-go to intercept point is computed (538). Interceptor heading error to the intercept point is computed, and the heading error is applied to guide the interceptor.

In a particular mode of this method, the step of determining if (b) the target missile is capable of aerodynamic flight (526) comprises the steps of, from time to time, determining the exoatmospheric specific energy of the target missile (214). The exoatmospheric specific energy of the missile during successive determinations is computed, to establish the magnitude of exoatmospheric specific energy changes (216). The magnitude(s) of the specific energy changes are compared with a threshold energy, and if the specific energy changes exceed the threshold, the target missile is deemed to be capable of aerodynamic flight (220). The successive determinations may be immediately successive determinations.

What is claimed is:

1. A method for engaging a ballistic missile target, said method comprising the steps of:
    sensing a ballistic target, measuring its position, and determining its velocity;
    determining specific energy of said target;
    processing a current determination of specific energy with that of a previous determination to generate a specific energy difference;
    comparing said specific energy difference with a threshold energy;
    if said difference is below said threshold, repeating said steps of determining, processing, and comparing;
    if said difference is greater than said threshold, deeming said target to be maneuvering and to be of a type of target which transitions from exoatmospheric ballistic motion to aerodynamic flight;
    determining an expected intercept point within the atmosphere; and
    guiding an interceptor missile toward said expected intercept point.

2. A method according to claim 1, wherein said step of determining an expected intercept point includes the steps of:
    determining a ballistic intercept point assuming that the target follows a ballistic trajectory; and
    modifying said ballistic intercept point to account for aerodynamic flight.

3. A method according to claim 2 wherein said step of modifying the ballistic intercept point comprises the step of maintaining a predicted altitude of intercept above a threshold altitude.

4. A method according to claim 1, wherein said step of determining an expected intercept point within the atmosphere comprises the steps of:
- taking a difference between a current altitude of said target and a threshold value of altitude;
- determining a time-to-go for said target to reach said threshold value of altitude;
- determining a speed ratio related to an absolute velocity of said target and a horizontal velocity of said target;
- determining horizontal pseudocomponents of velocity of said target in horizontal flight by multiplying horizontal components of said target velocity by said speed ratio; and
- determining pseudo-horizontal-position of said target by adding a current horizontal position of said target to the quotient of (a) a difference between said pseudocomponents and said target velocity components (b) divided by said time-to-go.

5. A method according to claim 1, wherein said step of sensing a ballistic target comprises the step of illuminating said target with a radar system.

6. A method according to claim 1, wherein said step of sensing a ballistic target comprises illuminating the target using an infrared system.

7. A method according to claim 1, wherein said step of determining specific energy of said target is performed repeatedly at periodic intervals.

8. A method according to claim 1, wherein if said difference is less than said threshold, deeming said target to be a ballistic type of target; and
- initializing an interceptor missile for a ballistic target mode.

9. A method for engaging a target missile, said method comprising the steps of:
- tracking said target missile with a sensor, and computing a sensor-to-target range, a target velocity, and an interceptor-to-target range;
- computing an interceptor average velocity;
- computing a target missile relative heading to intercept assuming ballistic motion of said target missile;
- computing an interceptor relative heading to intercept assuming ballistic motion of said target missile;
- computing an interceptor time-to-go to intercept assuming ballistic motion of said target missile;
- computing a predicted intercept point assuming ballistic motion of said target missile;
- determining if (a) said predicted intercept point assuming ballistic motion is less than a threshold altitude and (b) said target missile is capable of aerodynamic flight;
- if (a) said predicted intercept point is less than a threshold altitude and (b) said target missile is capable of aerodynamic flight, adjusting kinetic parameters of said target missile to reflect horizontal motion at said threshold altitude;
- computing said target missile relative heading to intercept assuming adjusted motion of said target missile;
- computing said interceptor relative heading to intercept assuming adjusted motion of said target missile;
- computing said interceptor time-to-go to intercept assuming adjusted motion of said target missile;
- computing said predicted intercept point assuming adjusted motion of said target missile;
- computing an interceptor range-to-go to intercept point; and
- computing an interceptor heading error to the intercept point and applying said heading error to guide said interceptor.

10. A method according to claim 9, wherein said step of determining if (b) said target missile is capable of aerodynamic flight comprises the steps of:
- determining an exoatmospheric specific energy of said target missile;
- comparing the exoatmospheric specific energy of said target missile during successive determinations, to establish a magnitude of specific energy changes;
- comparing said magnitude of specific energy changes with a threshold energy; and
- if said specific energy changes exceed said threshold energy, deeming said target missile to be capable of aerodynamic flight.

11. A method according to claim 10, wherein said successive determinations are immediately successive determinations.

12. A method according to claim 9, wherein said step of computing said predicted intercept point includes the steps of:
- determining a ballistic intercept point assuming that the target follows a ballistic trajectory; and
- modifying said ballistic intercept point to account for aerodynamic flight.

13. A method according to claim 12, wherein said step of modifying said ballistic intercept point comprises the step of maintaining a predicted altitude of intercept above a threshold altitude.

14. A method according to claim 9, wherein said step of computing a predicted intercept point includes the steps of:
- taking a difference between a current altitude of said target missile and a threshold value of altitude;
- determining a time-to-go for said target missile to reach said threshold value of altitude;
- determining a speed ratio related to an absolute velocity of said target missile and a horizontal velocity of said target missile;
- determining horizontal pseudocomponents of velocity of said target missile in horizontal flight by multiplying horizontal components of said target velocity by said speed ratio; and
- determining pseudo-horizontal-position of said target missile by adding a current horizontal position of said target missile to the quotient of (a) a difference between said pseudocomponents and said target velocity components (b) divided by said time-to-go.

15. A method according to claim 9, wherein said step of tracking said target missile with a sensor comprises the step of illuminating said target with a radar system.

16. A system for engaging a target missile following a track which transitions from exoatmospheric to atmospheric, said system comprising:
- a radar system for tracking said target missile, and for measuring its position and velocity;
- a specific energy sensor coupled to said radar system for determining a specific energy of said target missile;
- a first processor coupled to said specific energy sensor, for taking the difference between a current determination of specific energy with that of a previous determination to generate a specific energy difference;
- a comparator for comparing said specific energy difference with a threshold energy;
- a second processor coupled to said comparator, for,
  - in response to said specific energy difference being greater than said threshold while said target is exoatmospheric, deeming said target to be maneuvering and to be of a type which transitions from exoatmospheric ballistic motion to aerodynamic flight;

determining a predicted intercept point within the atmosphere and at a predetermined altitude; and guiding an interceptor missile horizontally toward said predicted intercept point.

17. A system according to claim 16, wherein said step of determining a predicted intercept point includes the steps of:

determining a ballistic intercept point assuming that the target missile follows a ballistic trajectory; and modifying said ballistic intercept point to account for aerodynamic flight.

18. A system according to claim 17, wherein said step of modifying the ballistic intercept point comprises the step of maintaining a predicted altitude of intercept above a threshold altitude.

19. A system according to claim 16, wherein said step of determining a predicted intercept point comprises the steps of:

taking a difference between a current altitude of said target missile and a threshold value of altitude;

determining a time-to-go for said target missile to reach said threshold value of altitude;

determining a speed ratio related to an absolute velocity of said target missile and a horizontal velocity of said target missile;

determining horizontal pseudocomponents of velocity of said target missile in horizontal flight by multiplying horizontal components of said target velocity by said speed ratio; and determining pseudo-horizontal-position of said target missile by adding a current horizontal position of said target missile to the quotient of (a) a difference between said pseudocomponents and said target velocity components (b) divided by said time-to-go.

20. A system according to claim 16, wherein said first processor coupled to said specific energy sensor and said second processor coupled to said comparator are the same processor.

\* \* \* \* \*